United States Patent
Sasaki

(10) Patent No.: US 10,805,609 B2
(45) Date of Patent: Oct. 13, 2020

(54) IMAGE PROCESSING APPARATUS TO GENERATE PANORAMIC IMAGE, IMAGE PICKUP APPARATUS TO GENERATE PANORAMIC IMAGE, CONTROL METHOD OF IMAGE PROCESSING APPARATUS TO GENERATE PANORAMIC IMAGE, AND NON-TRANSITORY COMPUTER READABLE STORAGE MEDIUM TO GENERATE PANORAMIC IMAGE

(71) Applicant: CANON KABUSHIKI KAISHA, Tokyo (JP)

(72) Inventor: Takao Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 16/107,665

(22) Filed: Aug. 21, 2018

(65) Prior Publication Data
US 2019/0068972 A1 Feb. 28, 2019

(30) Foreign Application Priority Data
Aug. 23, 2017 (JP) .................. 2017-160568

(51) Int. Cl.
| | |
|---|---|
| H04N 19/139 | (2014.01) |
| G06T 7/73 | (2017.01) |
| H04N 5/232 | (2006.01) |
| G06T 7/33 | (2017.01) |

(52) U.S. Cl.
CPC ........... *H04N 19/139* (2014.11); *G06T 7/337* (2017.01); *G06T 7/73* (2017.01); *H04N 5/232* (2013.01); *H04N 5/23229* (2013.01); *H04N 5/23238* (2013.01); *G06T 2200/32* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 5,712,474 A * | 1/1998 | Naneda | ............... | H04N 5/23248 250/208.1 |
| 6,285,711 B1 * | 9/2001 | Ratakonda | ........... | H04N 19/533 375/240.15 |
| 8,149,911 B1 * | 4/2012 | Alvarez | .................. | G06T 5/003 375/240.12 |
| 8,217,989 B2 * | 7/2012 | Kim | ....................... | G03B 37/04 348/37 |
| 8,279,288 B2 * | 10/2012 | Son | ........................ | H04N 5/232 348/208.1 |

(Continued)

FOREIGN PATENT DOCUMENTS

| | | | | |
|---|---|---|---|---|
| JP | 2011166264 A * | 8/2011 | ............. | G06T 11/60 |
| JP | 2011-188035 A | 9/2011 | | |
| JP | 2013020528 A * | 1/2013 | | |

Primary Examiner — Jayanti K Patel
Assistant Examiner — Stefan Gadomski
(74) Attorney, Agent, or Firm — Canon U.S.A., Inc. IP Division

(57) ABSTRACT

An image processing apparatus detects motion vectors from a first area and a second area smaller than the first area of a processing target image in a plurality of images and uses the processing target image in combination of a panoramic image in a case where a difference between the motion vector detected from the first area and the motion vector detected from the second area is within a predetermined range.

11 Claims, 13 Drawing Sheets

(56) References Cited

U.S. PATENT DOCUMENTS

| | | | |
|---|---|---|---|
| 8,947,502 B2* | 2/2015 | Mashiah | H04N 5/23238 348/231.3 |
| 9,247,129 B1* | 1/2016 | Gray | G06T 7/11 |
| 9,712,734 B2* | 7/2017 | Jeong | G03B 37/04 |
| 10,148,875 B1* | 12/2018 | Chen | H04N 21/637 |
| 2001/0021272 A1* | 9/2001 | Yamori | H04N 19/51 382/236 |
| 2003/0133020 A1* | 7/2003 | Suh | G06T 3/4038 348/218.1 |
| 2004/0027454 A1* | 2/2004 | Vella | G06T 7/215 348/155 |
| 2004/0131249 A1* | 7/2004 | Sandrew | G06T 11/001 382/162 |
| 2004/0228544 A1* | 11/2004 | Endo | G06T 3/4038 382/284 |
| 2005/0180506 A1* | 8/2005 | Wittebrood | H04N 19/543 375/240.16 |
| 2005/0231602 A1* | 10/2005 | Obrador | G06T 7/20 348/208.14 |
| 2006/0034529 A1* | 2/2006 | Park | H04N 19/563 382/236 |
| 2006/0239571 A1* | 10/2006 | Dong | G06K 9/32 382/236 |
| 2007/0031004 A1* | 2/2007 | Matsui | G06T 7/33 382/103 |
| 2007/0297693 A1* | 12/2007 | Lee | G06T 5/50 382/284 |
| 2008/0152258 A1* | 6/2008 | Tulkki | G06T 3/4038 382/284 |
| 2009/0153647 A1* | 6/2009 | Auberger | G06T 3/4038 348/36 |
| 2009/0213234 A1* | 8/2009 | Chen | H04N 5/23248 348/208.4 |
| 2009/0231447 A1* | 9/2009 | Paik | G01S 3/7864 348/208.4 |
| 2009/0232416 A1* | 9/2009 | Murashita | G06T 5/50 382/294 |
| 2009/0257680 A1* | 10/2009 | Dhand | G06T 3/4038 382/284 |
| 2010/0020190 A1* | 1/2010 | Kawakatsu | G06T 3/4038 348/222.1 |
| 2010/0053321 A1* | 3/2010 | Kim | H04N 5/144 348/135 |
| 2010/0079665 A1* | 4/2010 | Yamauchi | H04N 19/172 348/416.1 |
| 2010/0085442 A1* | 4/2010 | Yamashita | H04N 5/232 348/222.1 |
| 2010/0141735 A1* | 6/2010 | Yamashita | H04N 5/232 348/36 |
| 2010/0177974 A1* | 7/2010 | Chen | H04N 5/145 382/236 |
| 2010/0194852 A1* | 8/2010 | Tseng | H04N 5/232 348/36 |
| 2010/0265406 A1* | 10/2010 | Shishido | H04N 19/43 348/699 |
| 2010/0306793 A1* | 12/2010 | Vilei | G06T 7/20 725/25 |
| 2011/0037861 A1* | 2/2011 | Auberger | H04N 5/144 348/208.4 |
| 2011/0096143 A1* | 4/2011 | Ono | G03B 37/04 348/36 |
| 2011/0102548 A1* | 5/2011 | Kim | H04N 13/221 348/46 |
| 2011/0149016 A1* | 6/2011 | Kimura | H04N 5/232 348/36 |
| 2011/0193941 A1* | 8/2011 | Inaba | G03B 35/14 348/46 |
| 2011/0211039 A1* | 9/2011 | Krishnan | G02B 7/182 348/36 |
| 2011/0229056 A1* | 9/2011 | Robertson | G06T 7/248 382/294 |
| 2011/0234750 A1* | 9/2011 | Lai | G03B 37/04 348/37 |
| 2012/0026283 A1* | 2/2012 | Kim | H04N 5/232 348/36 |
| 2012/0098986 A1* | 4/2012 | Robertson | H04N 19/523 348/222.1 |
| 2012/0169890 A1* | 7/2012 | Tian | H04N 5/145 348/207.11 |
| 2012/0212588 A1* | 8/2012 | Ohtomo | G01C 15/002 348/50 |
| 2012/0230606 A1* | 9/2012 | Sugiyama | H04N 1/3876 382/284 |
| 2012/0269451 A1* | 10/2012 | Luo | H04N 19/527 382/236 |
| 2013/0016180 A1* | 1/2013 | Ono | H04N 5/145 348/36 |
| 2013/0038680 A1* | 2/2013 | Mashiah | H04N 5/23238 348/36 |
| 2013/0076855 A1* | 3/2013 | Miyamoto | H04N 5/23238 348/36 |
| 2013/0176487 A1* | 7/2013 | Nakashima | H04N 7/014 348/452 |
| 2013/0176488 A1* | 7/2013 | Nakashima | H04N 7/014 348/452 |
| 2014/0072180 A1* | 3/2014 | Yamaguchi | G06T 7/254 382/107 |
| 2014/0118481 A1* | 5/2014 | Rimai | G06T 3/4038 348/36 |
| 2014/0118700 A1* | 5/2014 | Rimai | H04N 1/3876 352/69 |
| 2014/0185882 A1* | 7/2014 | Masuura | H04N 5/23254 382/107 |
| 2014/0307045 A1* | 10/2014 | Richardt | G06T 3/4038 348/36 |
| 2015/0178898 A1* | 6/2015 | Routhier | G06T 13/80 345/620 |
| 2015/0244944 A1* | 8/2015 | Tokutake | H04N 5/23296 348/239 |
| 2015/0269761 A1* | 9/2015 | Yamada | G06T 11/60 348/36 |
| 2015/0281575 A1* | 10/2015 | Yamada | H04N 5/23238 348/36 |
| 2015/0281576 A1* | 10/2015 | Yamada | H04N 5/23238 348/36 |
| 2015/0312478 A1* | 10/2015 | Barcovschi | H04N 5/23238 348/36 |
| 2016/0350893 A1* | 12/2016 | Fletcher | G06T 3/0081 |
| 2017/0118475 A1* | 4/2017 | Chang | H04N 19/56 |
| 2017/0163890 A1* | 6/2017 | Ishibashi | G06T 7/215 |
| 2017/0180641 A1* | 6/2017 | Yamada | G06T 7/38 |
| 2017/0347005 A1* | 11/2017 | Kimura | G06T 3/0068 |
| 2018/0040133 A1* | 2/2018 | Srinivasan | H04N 19/56 |
| 2018/0063513 A1* | 3/2018 | Bar | G06T 7/10 |
| 2018/0227485 A1* | 8/2018 | Shimauchi | H04N 5/232 |

* cited by examiner

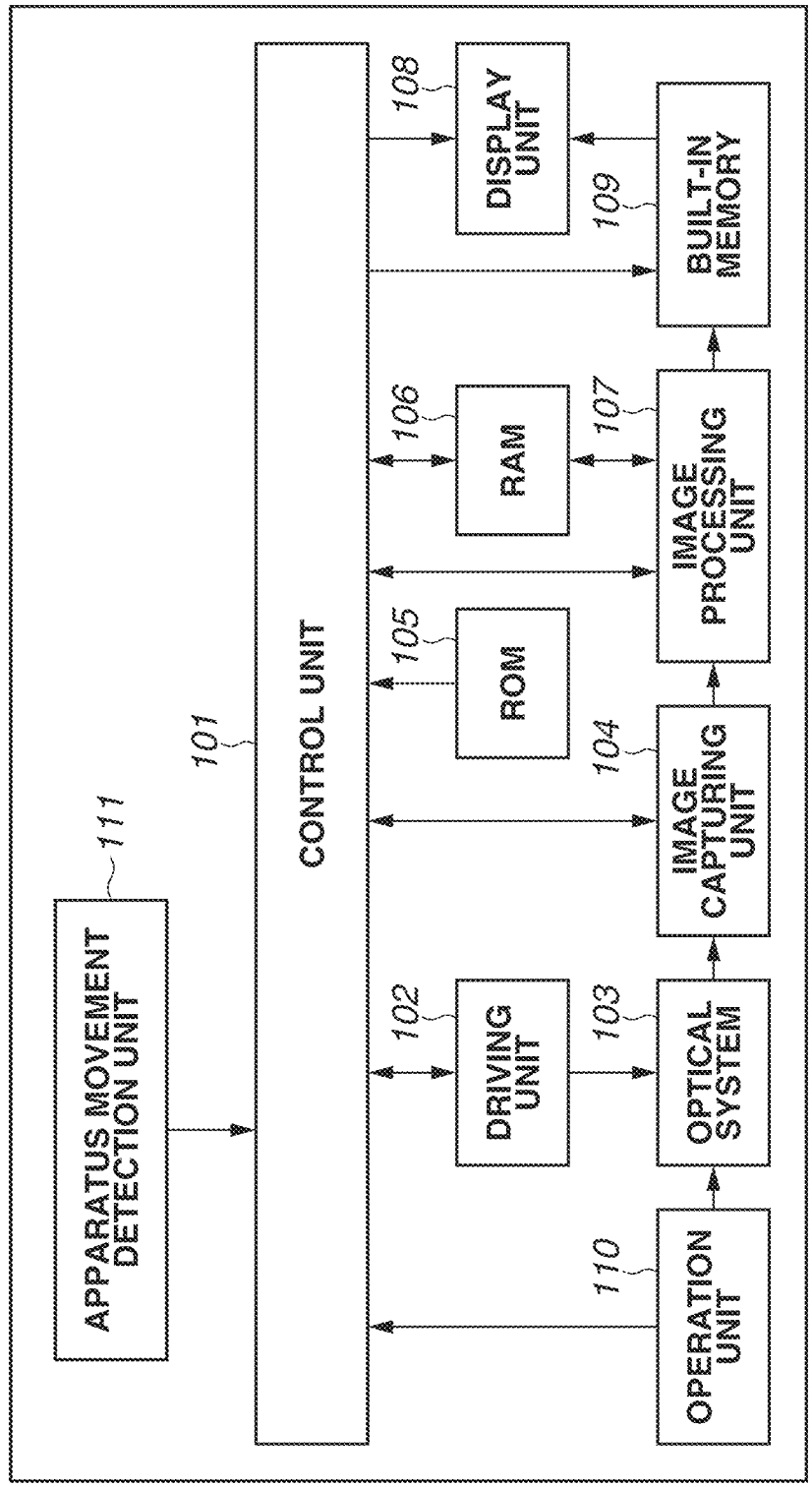

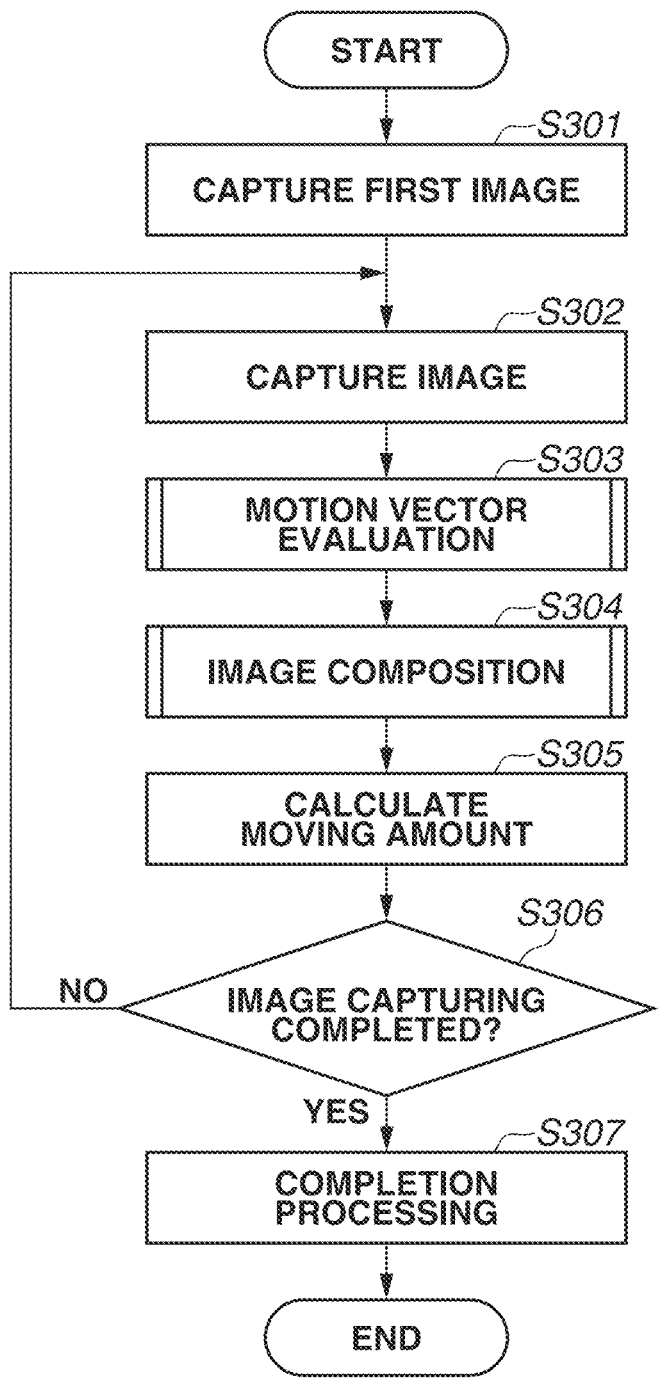

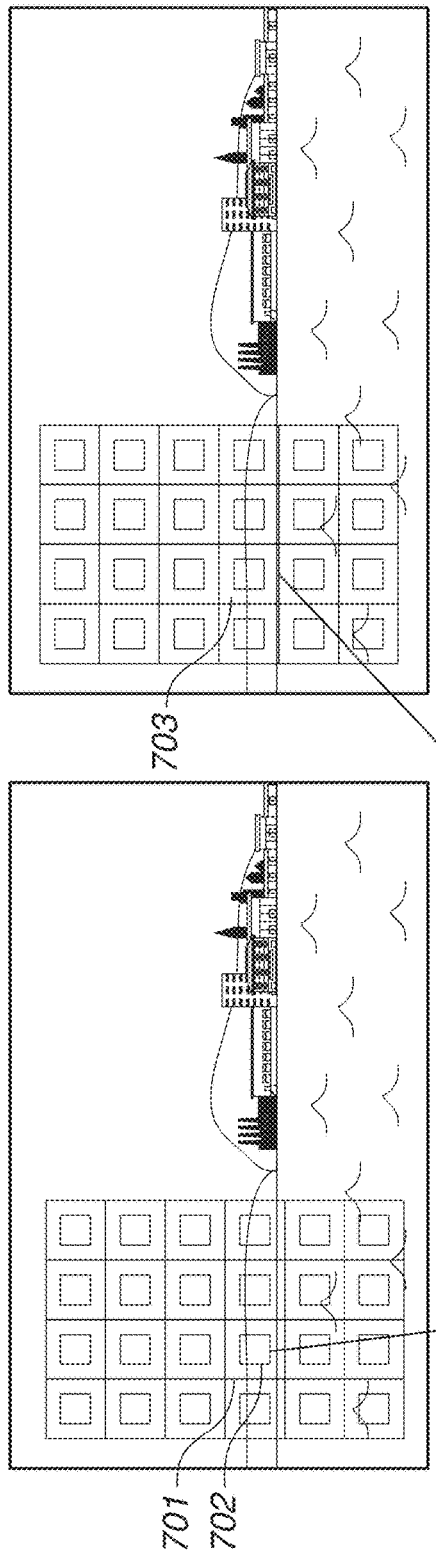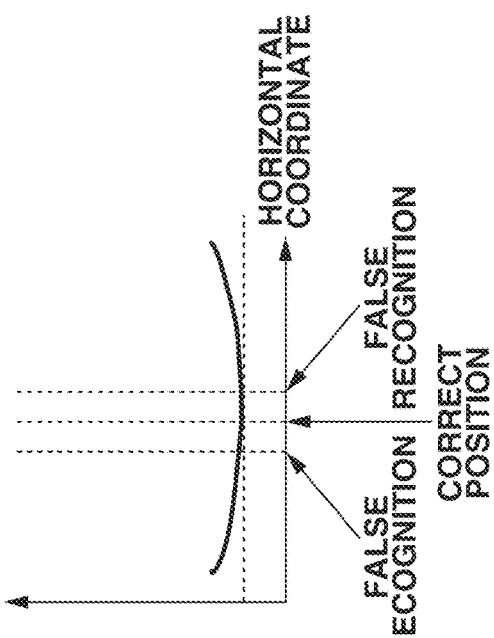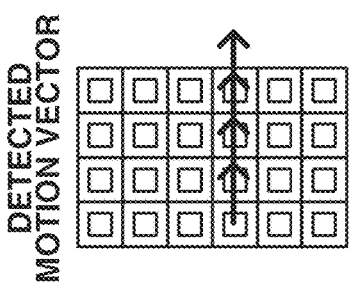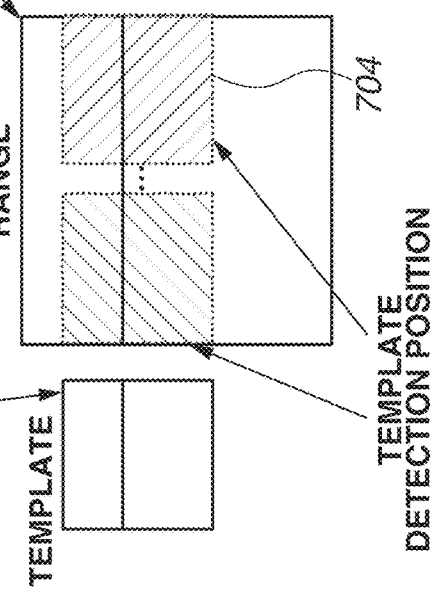

MOVING DIRECTION OF DIGITAL CAMERA 901  902

MOVING DIRECTION OF DIGITAL CAMERA

IMAGE PROCESSING APPARATUS TO GENERATE PANORAMIC IMAGE, IMAGE PICKUP APPARATUS TO GENERATE PANORAMIC IMAGE, CONTROL METHOD OF IMAGE PROCESSING APPARATUS TO GENERATE PANORAMIC IMAGE, AND NON-TRANSITORY COMPUTER READABLE STORAGE MEDIUM TO GENERATE PANORAMIC IMAGE

BACKGROUND OF THE INVENTION

Field of the Invention

The present invention relates to an image processing apparatus, and particularly relates to an image processing apparatus which aligns a plurality of images with each other.

Description of the Related Art

Panoramic composition techniques are known which capture a plurality of images while moving digital cameras and mobile phones with camera functions and combine the plurality of captured images.

Japanese Patent Application Laid-Open No. 2011-188035 describes a technique for detecting a motion vector from an image and performs alignment based on the detected motion vector.

However, it is difficult to detect a motion vector in some cases depending on an object, and if a motion vector can be detected, the motion vector is not necessarily correct information. When alignment is performed using erroneously detected motion vectors, panoramic composition is performed in which positions of an object are deviated.

SUMMARY OF THE INVENTION

Embodiments of the present invention are directed to generation of a panoramic image in which alignment accuracy between a plurality of images is high in view of the above-described issues.

Embodiments of the present invention provide an image processing apparatus which includes at least one memory configured to store instructions and at least one processor connected to the at least one memory and configured to execute the instructions to perform detection to detect a motion vector from a plurality of images and perform a combination using at least a part of the plurality of images to generate a panoramic image, wherein the at least one processor executes a further instruction to detect motion vectors from a first area and a second area smaller than the first area of a processing target image, and wherein the processing target image is used in the combination in a case where a difference between the motion vector detected from the first area and the motion vector detected from the second area is within a predetermined range.

Further features of the present invention will become apparent from the following description of exemplary embodiments with reference to the attached drawings.

BRIEF DESCRIPTION OF THE DRAWINGS

FIG. 1 is a block diagram illustrating a hardware configuration of a digital camera according to an exemplary embodiment of the present invention.

FIG. 3 is a flowchart illustrating panoramic image capturing processing according to a first exemplary embodiment.

FIGS. 7A to 7E illustrate a case where a motion vector is successfully detected only in an area along a moving direction of a digital camera.

DESCRIPTION OF THE EMBODIMENTS

Figure 2A:
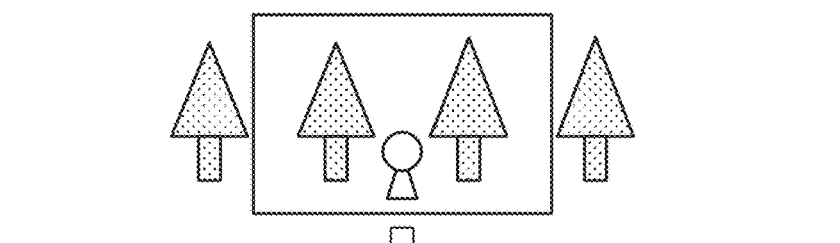
FIGS. 2A to 2F illustrate a flow of panoramic image composition processing according to the exemplary embodiment of the present invention.

Various exemplary embodiments of the present invention will be described in detail below with reference to the attached drawings.

FIG. 1 is a block diagram illustrating a configuration of a digital camera according to a first exemplary embodiment. A digital camera 100 can capture a still image, record information of an in-focus position, calculate a contrast value, and combine images. Further, the digital camera 100 can perform magnification processing or reduction processing on a captured and stored image or an externally input image.

A control unit 101 is a signal processor such as a central processing unit (CPU) and a micro processing unit (MPU) and controls each unit in the digital camera 100 while reading a program stored in advance in a read only memory (ROM) 105 described below. For example, as described below, the control unit 101 issues an instruction to start and end image capturing to an image capturing unit 104 described below. Alternatively, the control unit 101 issues an instruction to perform image processing to an image processing unit 107 described below based on a program stored in the ROM 105. An instruction from a user is input to the digital camera 100 by an operation unit 110 described below and transmitted to each unit in the digital camera 100 via the control unit 101.

A driving unit 102 which includes a motor and the like mechanically operates an optical system 103 described below under an instruction from the control unit 101. For example, the driving unit 102 moves a position of a focus lens included in the optical system 103 and adjusts a focal length of the optical system 103 based on an instruction from the control unit 101.

The optical system 103 includes a zoom lens, the focus lens, and a diaphragm. The diaphragm is a mechanism for adjusting a light amount passing therethrough. An in-focus position can be changed by changing a position of the lens.

The image capturing unit 104 is a photoelectric conversion element and photoelectrically converts an incident light signal to an electrical signal. For example, a charge coupled device (CCD) sensor and a complementary metal oxide semiconductor (CMOS) sensor can be used as the image capturing unit 104. The image capturing unit 104 has a moving image capturing mode and can capture a plurality of images which are temporally continuous as each frame of a moving image.

The ROM 105 is a read-only nonvolatile memory as a storage medium and stores an operation program of each block included in the digital camera 100 and parameters necessary for an operation of each block. A random access memory (RAM) 106 is a rewritable volatile memory and is used as a temporary storage area of data output from the operation of each block included in the digital camera 100.

The image processing unit 107 performs various types of image processing such as white balance adjustment, color interpolation, and filtering on an image output from the image capturing unit 104 or image signal data stored in a built-in memory 109 described below. The image processing unit 107 further performs compression processing based on a standard such as Joint Photographic Experts Group (JPEG) on image signal data captured by the image capturing unit 104.

The image processing unit 107 is constituted of an application specific integrated circuit (ASIC) which performs specific processing. Alternatively, the control unit 101 may perform a part of or an entire function of the image processing unit 107 by performing processing according to a program read from the ROM 105. In the case where the control unit 101 performs the entire function of the image processing unit 107, there is no need to include the image processing unit 107 as hardware.

A display unit 108 is a liquid crystal display and/or an organic light emitting (EL) display for displaying an image temporary stored in the RAM 106, an image stored in the built-in memory 109 described below, or a setting screen of the digital camera 100.

The built-in memory 109 stores an image captured by the image capturing unit 104, an image processed by the image processing unit 107, in-focus position information when an image is captured, and the like. A memory card may be used instead of the built-in memory.

The operation unit 110 includes, for example, a button, a switch, a key, and a mode dial provided to the digital camera 100 or a touch panel also used as the display unit 108. An instruction from a user is transmitted to the control unit 101 via the operation unit 110.

An apparatus movement detection unit 111 which is constituted of a gyro sensor is a device for detecting a movement of the digital camera 100 and detects a movement in a yaw direction and a pitch direction based on a change of an angle per unit time namely an angular velocity of the digital camera 100.

Figure 2B:
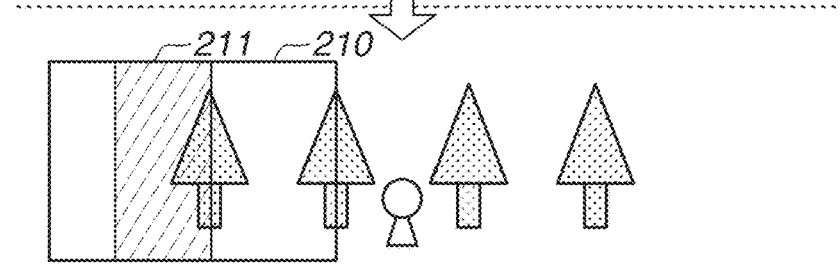
Figure 2C:
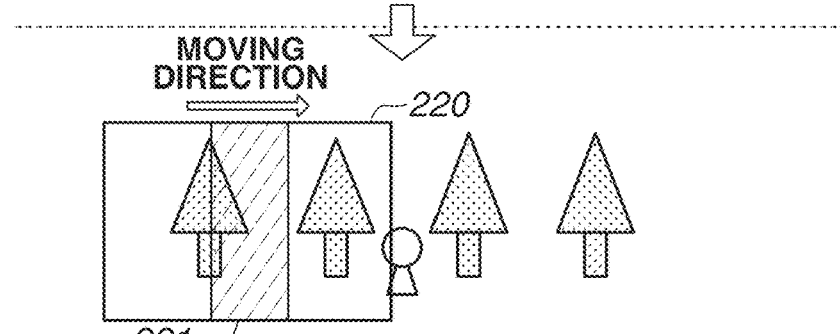
Figure 2D:
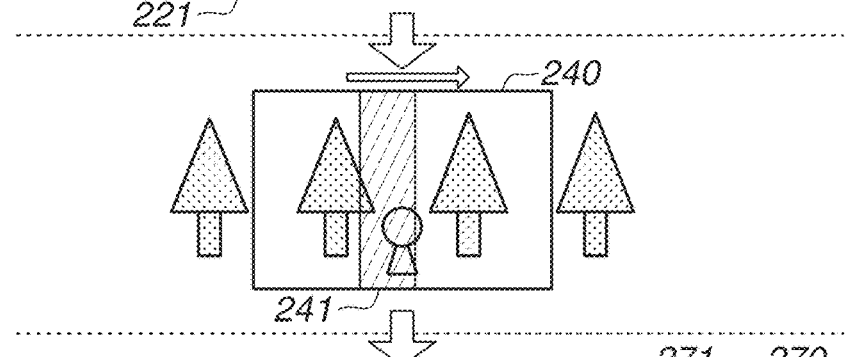
Figure 2E:
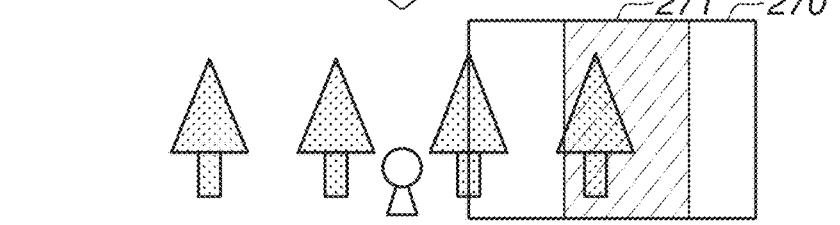

FIGS. 2A to 2F illustrate a flow of panoramic image composition processing according to the present exemplary embodiment of the present invention. In FIGS. 2A to 2F, dot-hatched areas schematically represent a line of trees in an object field, and slash-hatched areas represent clipped areas of image data. FIG. 2A illustrates a situation in which a user presses the button provided to the operation unit 110 to bring a main object into focus. FIG. 2B illustrates a situation in which the user sets a field angle by adjusting the field angle to an end of a panoramic image to be combined. In FIG. 2B, the image capturing unit 104 captures an image 210. FIGS. 2C to 2E schematically illustrate a situation in which the user performs panoramic image capturing while moving the digital camera 100 toward the other end of the panoramic image to be combined. FIG. 2E illustrates a situation in which the user finishes pressing of the button, and panoramic image capturing is finished. In FIGS. 2B to 2E, the image capturing unit 104 captures a total of seven images, namely images 210 to 270, in which the images 230, 250, and 260 are not illustrated. The image processing unit 107 performs clipping processing on the images 210 to 270 captured by the image capturing unit 104 and generates clipped areas 211 to 271. The control unit 101 may determine a width of a clipped area in advance or may change the width according to a moving speed of the digital camera 100 during the panoramic image capturing.

Figure 2F:
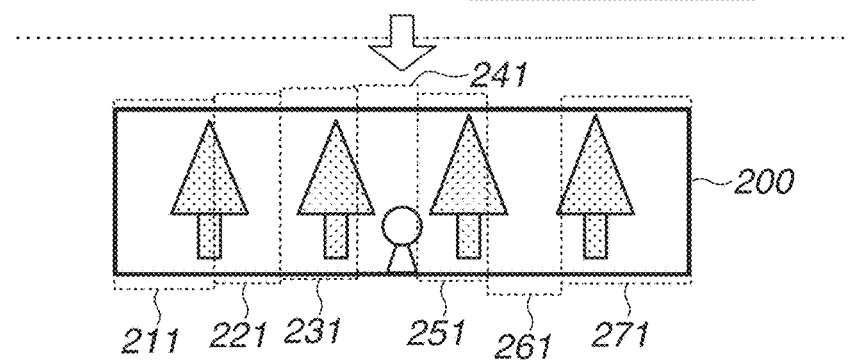

FIG. 2F illustrates a panoramic image obtained by combining a plurality of images captured by the image capturing unit 104 by the image processing unit 107. In this regard, the control unit 101 aligns images before combining. In addition, the image processing unit 107 performs clipping processing with respect to a vertical direction since upper sides and lower sides of the clipped areas 211 to 271 are not aligned because of a camera shake and the like. Accordingly, the image processing unit 107 generates a panoramic image as shown in an area 200.

The control unit 101 performs alignment based on a plurality of motion vectors detected by the image processing unit 107. As an example, the image processing unit 107 divides the clipped area into small blocks of an arbitrary size and calculates a corresponding point of each small block at which a sum of absolute difference (hereinbelow, referred to as a SAD) of brightness is a minimum. The control unit 101 can calculate a motion vector from the corresponding point at which the calculated SAD is the minimum. The control unit 101 may use a sum of squared difference (hereinbelow, referred to as a SSD), normalized cross correlation (hereinbelow, referred to as NCC), and the like in addition to the SAD.

FIGS. 2A to 2F illustrate an example in which the clipped areas 211 to 271 are adjacent to each other without including overlapping areas therebetween for simplifying the description. When there is an overlapping area, the image processing unit 107 regards the center of the overlapping area as a boundary and outputs pixel information of the one clipped area to a left side and pixel information of the other clipped area to a right side of the combined image. Alternatively, the image processing unit 107 outputs a value obtained by combining the pixel information pieces of the both clipped areas by 50% each on the boundary, and a ratio of the one clipped area is increased on the left side of the boundary and a ratio of the other clipped area is increased on the right side of the boundary as a distance from the boundary increased.

In FIGS. 2A to 2F, the clipped area is set at a different position in each image and a size of the clipped area is different, however, the image processing unit 107 generally clips out an equal-size area from the center of each image in consideration of distortion.

FIG. 3 is a flowchart illustrating panoramic image capturing processing according to the present exemplary embodiment.

In step S301, the image capturing unit 104 captures a first image. In step S301, the image processing unit 107 performs development processing, however, the processing is not described in the flowchart for simplifying the description.

In step S302, the image capturing unit 104 captures second and subsequent images.

In step S303, the control unit 101 performs motion vector evaluation on processing target images captured by the image capturing unit 104 in step S302 and set either of a "High" flag and a "Low" flag thereto. Details are described below.

In step S304, the control unit 101 performs image composition based on a result of the motion vector evaluation in step S303. Details are described below.

In step S305, the control unit 101 calculates a moving amount between two adjacent images which are determined to be used in composition by the control unit 101 in step S304. Calculation of the moving amount in step S305 is to determine whether panoramic image capturing can be continued. When the calculated moving amount is wider than a field angle of the image, it is desirable to stop panoramic image capturing because using such an image in composition may generate a gap in which the object is not captured.

Figure 4:
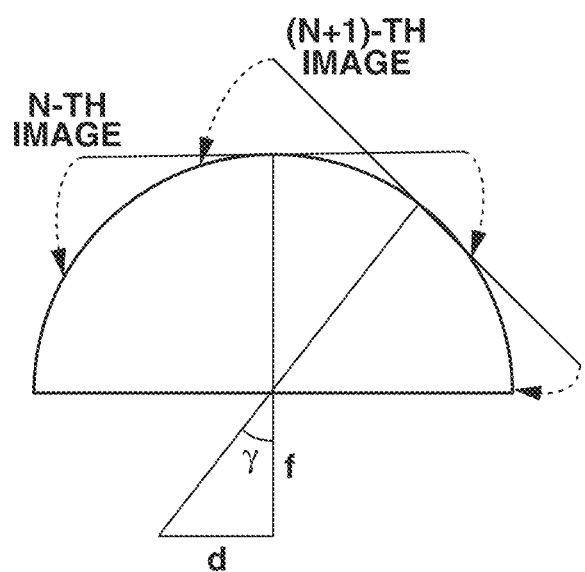
FIG. 4 illustrates how to calculate a moving amount according to the first exemplary embodiment.

FIG. 4 illustrates how to calculate a moving amount according to the present exemplary embodiment. For example, when cylindrical conversion for pasting images on a cylinder is performed to generate a panoramic image, a maximum value of a rotation angle can be calculated using a following (equation 1) with reference to FIG. 4.

[Equation 1]

$$\gamma = \tan^{-1}\frac{d}{f} = \tan^{-1}\left[\frac{(1-a \cdot b)}{2} \cdot \frac{\mu}{f}\right] \quad \text{(Equation 1)}$$

In (Equation 1), "γ" represents a maximum rotation angle, "f" represents a focal length, and "μ" represents a pixel pitch of a sensor. A focal length f is generally expressed in millimeters (mm), however, a pixel pitch μ of a sensor is expressed in micrometers (μm), so that the units need to be unified when calculation is performed. Further, "a" represents a block size of a detection area, and "b" represents the number of blocks in a moving direction of the digital camera 100. A detection area and a block are described in detail in a description of the motion vector evaluation below.

The above-described rotational angle calculation is an example when using a cylindrical conversion method, however, a generation method of a panoramic image is not limited to this.

In step S306, the control unit 101 determines whether to complete image capturing. When image capturing is completed (YES in step S306), the processing proceeds to step S307, whereas when image capturing is not completed (NO in step S306), the processing returns to step S302. A criterion of completion of image capturing may include, for example, a completion instruction manually issued by a user and attainment of a preliminarily set field angle.

In step S307, the control unit 101 performs completion processing of image capturing. The completion processing mentioned here mainly includes presentation of an image capturing result and error display in the case of failure of composition as described below to a user via the display unit 108.

The flow of image capturing according to the present exemplary embodiment is described above. Next, the motion vector evaluation in step S303 and the image composition in step S304 are described in detail.

Figure 5:
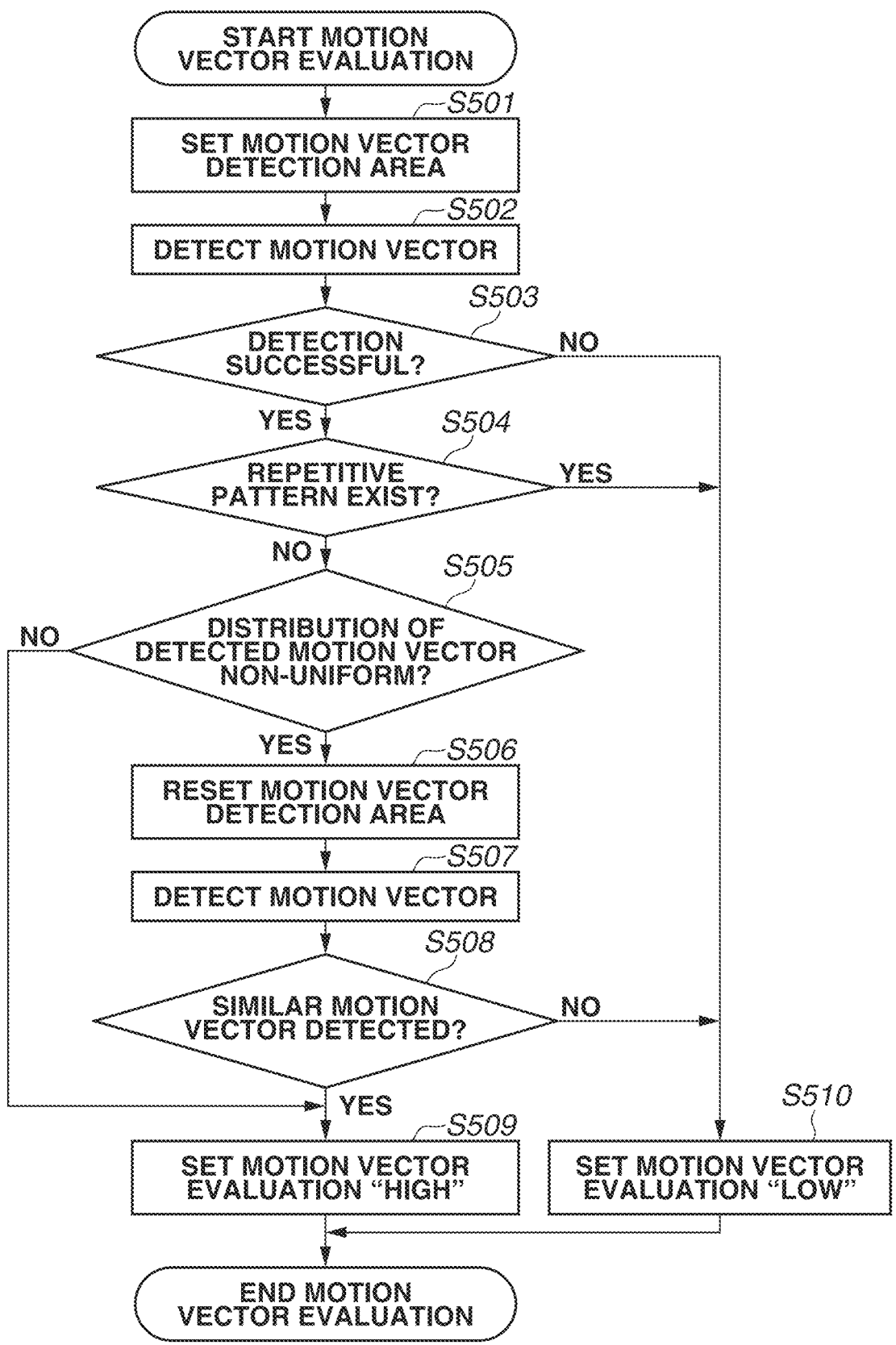
FIG. 5 is a flowchart illustrating motion vector evaluation processing according to the first exemplary embodiment.

FIG. 5 is a flowchart illustrating motion vector evaluation processing according to the present exemplary embodiment. In step S501, the control unit 101 sets a partial area in an image captured earlier in two images captured immediately before as a detection area. It is desirable that the control unit 101 sets the detection area in the center of the image in consideration of distortion. In step S502, the control unit 101 detects a motion vector. The control unit 101 first sets a plurality of small blocks in the detection area set in step S501. It is desirable that each small block is set to the same size. Thus, the control unit 101 selects any of the plurality of small blocks set in the one image and sets a detection area which is on the same position of and larger than the selected small block in the other image. The control unit 101 extracts an area of which correlation with the selected small block in the one image is the highest (a SAD value is the smallest) in the detection area in the other image. In correlation calculation described here, for example, the SAD, the SSD, and the NCC may be used.

In step S503, the control unit 101 determines whether detection of the motion vector is successful in step S502. The control unit 101 determines whether detection of the motion vector is successful based on a following condition. For example, when a contrast of a motion vector detection area is low, it is difficult for the control unit 101 to obtain a highly accurate motion vector even if any of the SAD, the SSD, and the NCC is used. Therefore, the control unit 101 determines that detection is not successful in the case where a motion vector is detected from an area having a contrast lower than a predetermined contrast threshold value. Alternatively, the apparatus movement detection unit 111 detects movement information such as an angular velocity of the digital camera 100 at the same time as image capturing in step S302. The control unit 101 compares the movement information detected by the apparatus movement detection unit 111 with the motion vector detected in step S502 and determines that detection of the motion vector is not successful when a difference between the movement information and the motion vector exceeds a predetermined value.

In step S503, when the number of the motion vectors determined as successfully detected is greater than a predetermined number (YES in step S503), the control unit 101 advances the processing to step S504. Otherwise (NO in step S503), the control unit 101 advances the processing to step S510. In step S510, the control unit 101 sets a motion vector evaluation flag to "Low".

In step S504, the control unit 101 determines whether a repetitive pattern exists in the detection area set in step S501. When a repetitive pattern exists (YES in step S504), the control unit 101 advances the processing to step S510 and sets the motion vector evaluation flag to "Low". When a repetitive pattern does not exist (NO in step S504), the processing proceeds to step S505.

Figure 6A:
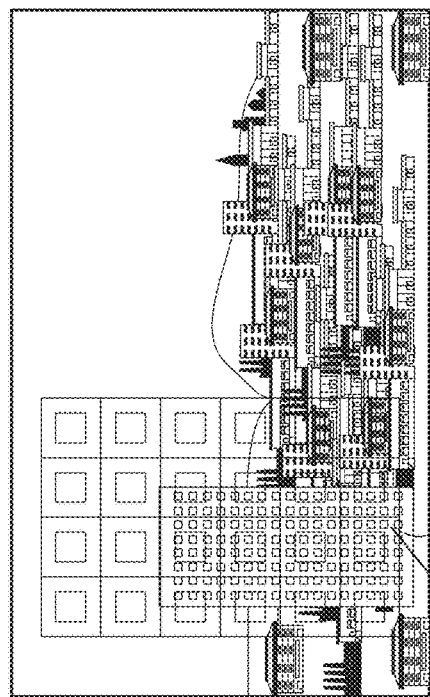
FIGS. 6A to 6D illustrate a case where a repetitive pattern exists.
Figure 6B:
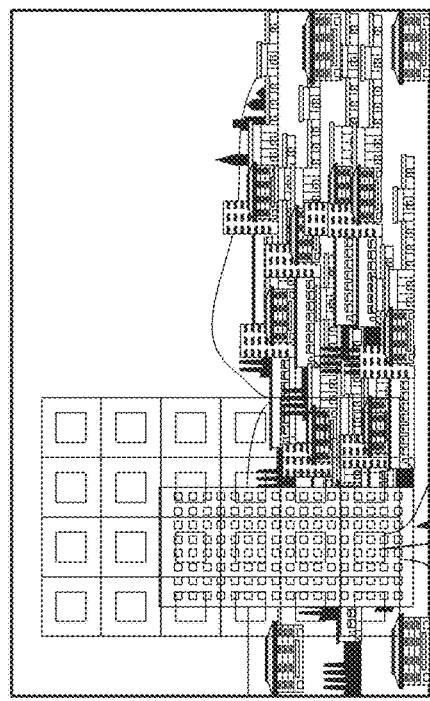
Figure 6D:
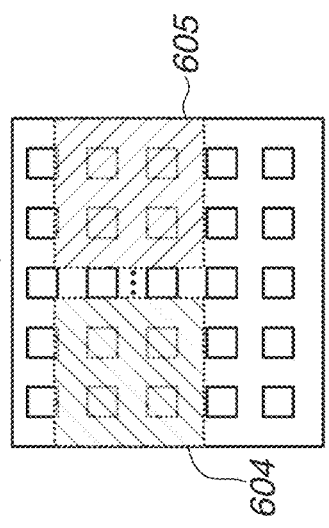
Figure 6C:
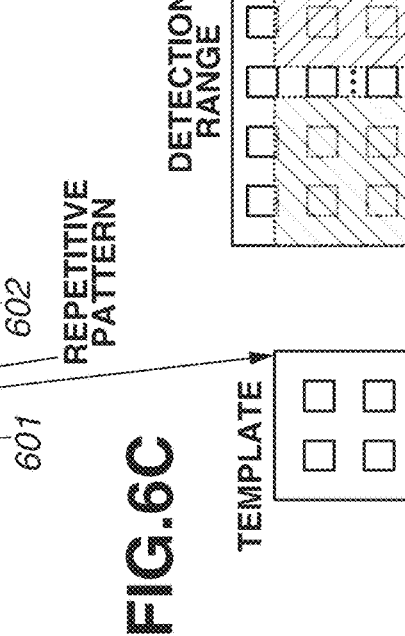

In the case of an image including a repetitive pattern, a similar image is captured when the digital camera is moved, and it is highly likely that an error in a detected motion vector becomes large even if the control unit 101 uses any method of the SAD, the SSD, and the NCC. FIGS. 6A to 6D illustrate a case where a repetitive pattern exists in an image. A case is described in which the control unit 101 performs detection of a motion vector on two images illustrated in FIGS. 6A and 6B. In the two images illustrated in FIGS. 6A and 6B, windows of buildings correspond to the repetitive patterns. For example, the control unit 101 attempts to detect a motion vector from a small area 601. The control unit 101 regards a center area in the small area 601 as a template 602 and a small area 603 in the image in FIG. 6B as a detection range and detects a portion at which correlation with the template 602 is the highest from the small area 603. As described above, the control unit 101 can use any method of the SAD, the SSD, and the NCC of brightness, and the SAD of brightness is described as an example below. The control unit 101 sets a range corresponding to a size of the template 602 to the small area 603 as the detection range and calculates the SAD of the template 602 and the range while slightly shifting a position of the range. A relationship between horizontal coordinates and a SAD in a horizontal direction is as illustrated in FIG. 6D, and it can be seen that there are two minimum values. This is because a pattern similar to the template 602 appears in both of an area 604 and an area 605 as illustrated in FIG. 6C. Therefore, when the repetitive pattern exists in the detection area, even if the control unit 101 can successfully detect a motion vector, alignment accuracy is highly likely to be reduced.

In step S505, the control unit 101 determines whether distribution of the motion vectors determined as successfully detected in step S503 is non-uniform. Generally, the alignment accuracy is higher as motion vectors are uniformly distributed in the entire detection area. In contrast, the alignment accuracy is low when the successfully detected motion vectors exist only in a part of the detection area. Thus, when determining that the distribution of the motion vector is not non-uniform (is uniform), (NO in step S505), the control unit 101 advances the processing to step S509, whereas when determining as non-uniform (YES in step S505), the control unit 101 advances the processing to step S506 to determine accuracy of the detected motion vector.

The above-described determination of the repetitive pattern is performed by the control unit 101 using the SAD as an example. When the repetitive pattern exists in the image, the control unit 101 can detect a point at which the SAD becomes local minimum by differentiating the SAD. When a plurality of points at which the SAD becomes local minimum is detected, the control unit 101 determines that the repetitive pattern exists.

FIGS. 7A to 7E illustrate a case in which the motion vector is successfully detected only in an area along the moving direction of the digital camera 100 as an example of when distribution of areas determined that the motion vectors are successfully detected is non-uniform. It is assumed that the control unit 101 performs detection of the motion vector on two images illustrated in FIGS. 7A and 7B, accordingly succeeds in detection of the motion vectors only in small areas corresponding to a mountain and does not succeed in detection of the motion vector in other small areas because of low contrast and the like. FIG. 7D illustrates the motion vectors successfully detected. For example, when detecting the motion vector from a small area 701, the control unit 101 regards a center area in the small area 701 as a template 702 and a small area 703 in the image illustrated in FIG. 7B as the detection range. Further, the control unit 101 detects a portion at which correlation with the template 702 is the highest from the small area 703. As described above, the control unit 101 can use any method of the SAD, the SSD, and the NCC of brightness, and the SAD of brightness is described as an example below. Further, detection in the horizontal direction is only described for the convenience of the description. The control unit 101 sets a range 704 corresponding to a size of the template 702 in the small area 703 as the detection range and calculates the SAD of the template 702 and the range 704 while slightly shifting the horizontal coordinates of the range 704. A relationship between the horizontal coordinates and the SAD is as illustrated in FIG. 7E, and it can be seen that it is difficult to determine a minimum value thereof. Therefore, in the case illustrated in FIGS. 7A to 7E, the alignment accuracy is highly likely to be low even if the control unit 101 succeeds in detection of the motion vector.

Figure 8:
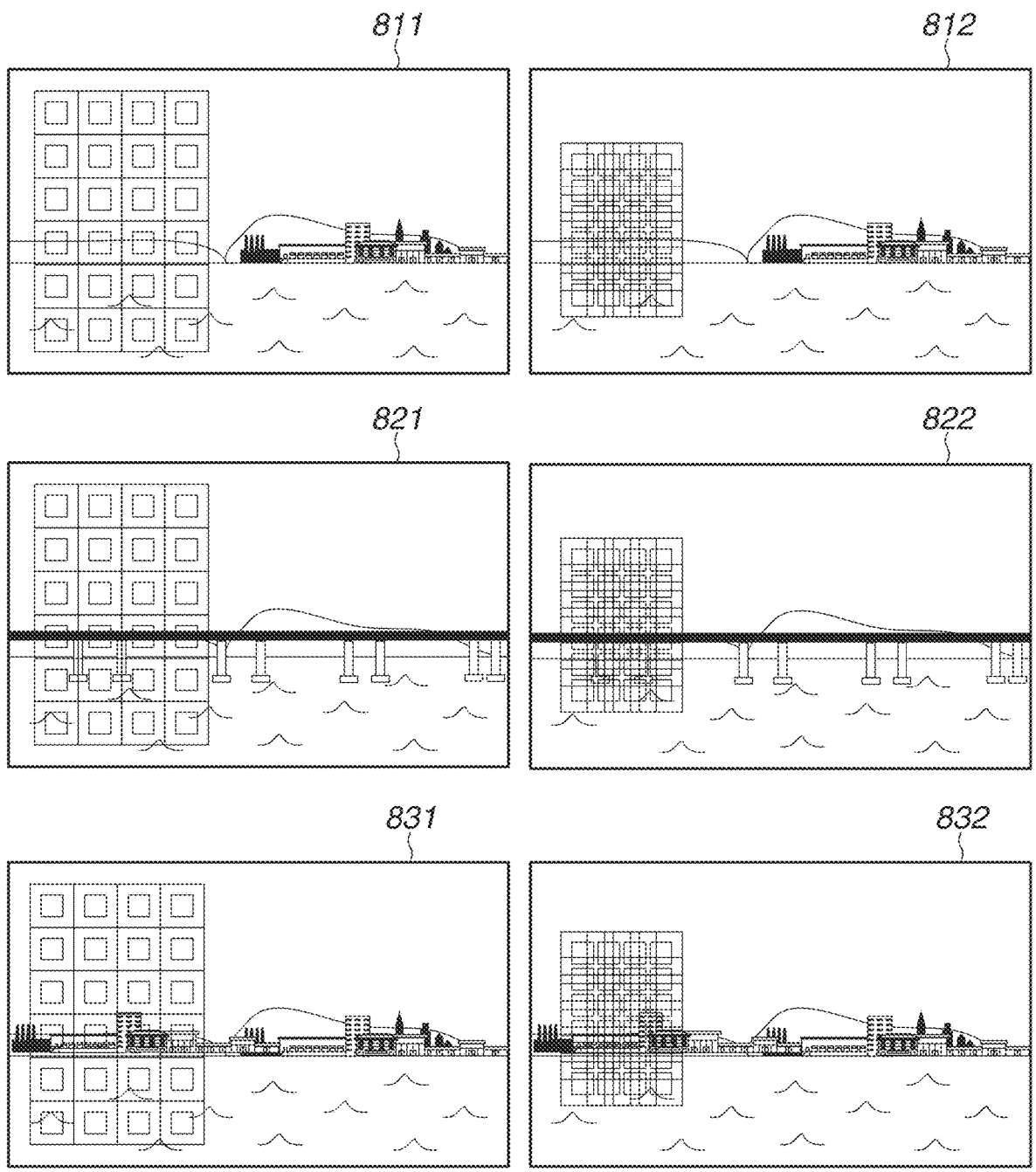
FIG. 8 illustrates resetting of a motion vector detection area according to the first exemplary embodiment.

In step S506, the control unit 101 resets the motion vector detection area. FIG. 8 illustrates how to reset the motion vector detection area according to the present exemplary embodiment. The control unit 101 respectively detects the motion vectors between an image 811 and an image 812, between an image 821 and an image 822, and between an image 831 and an image 832 in FIG. 8. FIG. 8 illustrates a state in which the detection areas set in step S501 are set to the images 811 to 831 on the left side of FIG. 8, and the detection areas are reset in step S506 in the images 812 to 832 on the right side thereof. The reset detection areas indicated in the respective images 812 to 832 are obtained by the control unit 101 narrowing down the detection areas indicated in the images 811 to 831. Specifically, the control unit 101 shortens intervals of areas corresponding to the templates without changing their sizes. Further, the control unit 101 sets small areas without changing sizes of the small areas and relationships between the small areas and the templates. It is necessary that the reset detection area overlaps with a position of the small area determined that the motion vector is successfully detected in step S503. Thus, a position of the detection area to be reset may be adjusted based on the position of the small area determined that the motion vector is successfully detected in step S503. When the small areas determined that the motion vectors are successfully detected in step S503 are distantly distributed, a plurality of detection areas may be reset based on the respective distant positions.

In step S507, the control unit 101 detects the motion vector from the motion vector detection area reset in step S506. The detection method is the same as that in step S502.

In step S508, the control unit 101 determines whether the motion vector detected in step S508 is similar to the motion vector detected in step S502. When differences of magnitude and direction between the motion vector detected in step S508 and the motion vector detected in step S502 are within predetermined ranges, it is determined that the motion vectors are similar to each other. When it is determined that the detected motion vectors are similar to each other (YES in step S508), the control unit 101 advances the processing to step S509 and sets the motion vector evaluation flag to "High". Whereas when it is determined that the detected motion vectors are not similar to each other (NO in step S508), the control unit 101 advances the processing to step S510 and sets the motion vector evaluation flag to "Low".

Figure 9A:
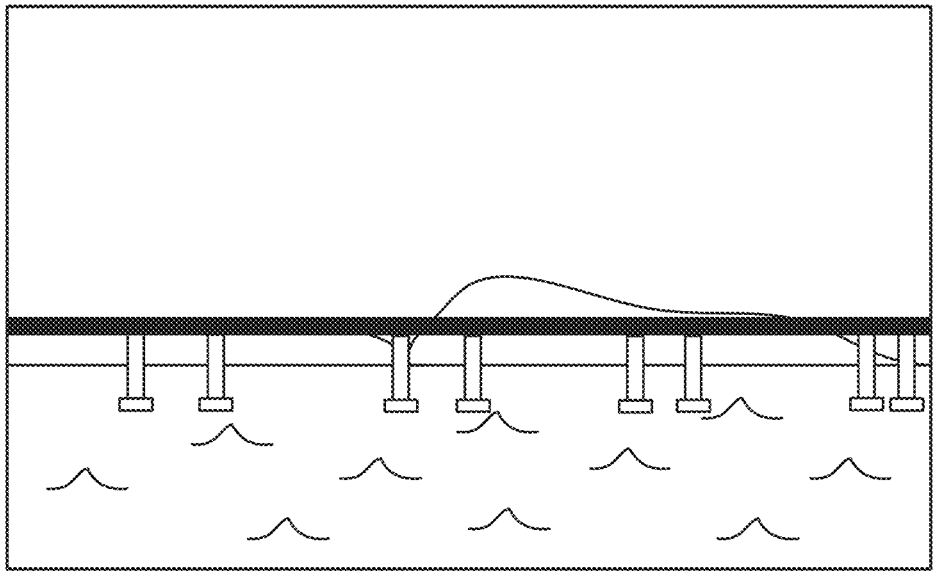
FIGS. 9A and 9B illustrate an image which includes a characteristic pattern in a part of small areas linearly distributed according to the first exemplary embodiment.
Figure 9B:
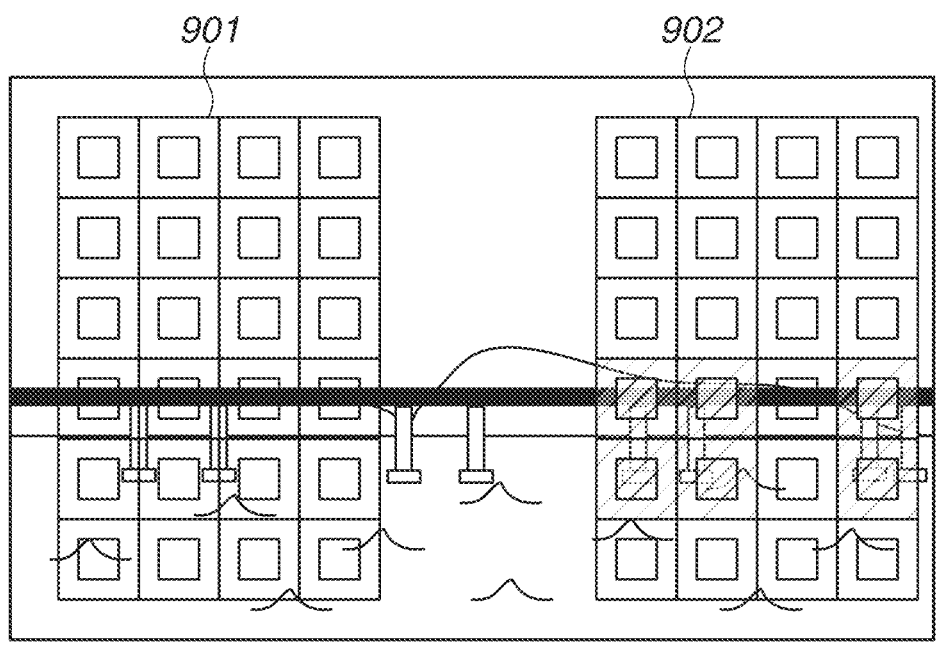
Figure 10A:
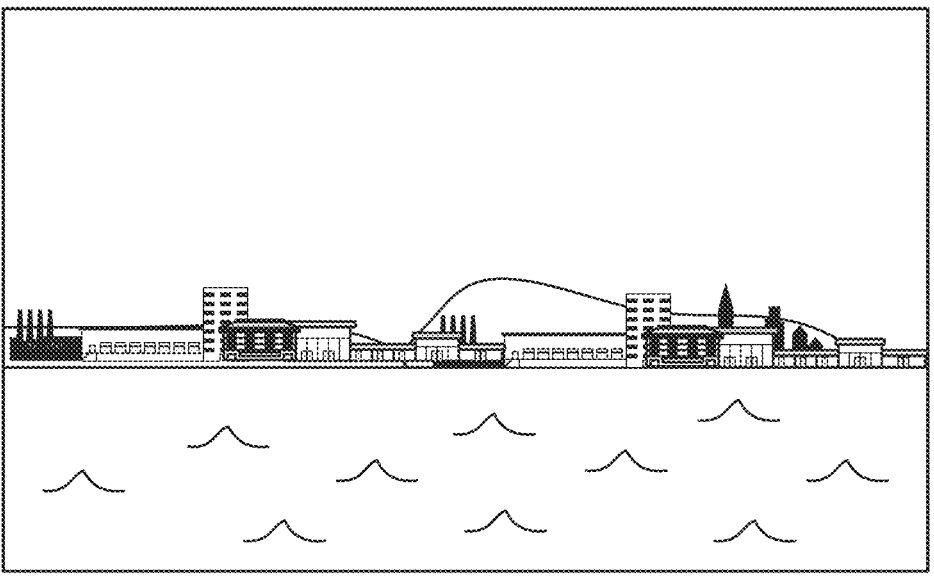
FIGS. 10A and 10B illustrate an image which includes complicated patterns in all small areas linearly distributed according to the first exemplary embodiment.
Figure 10B:
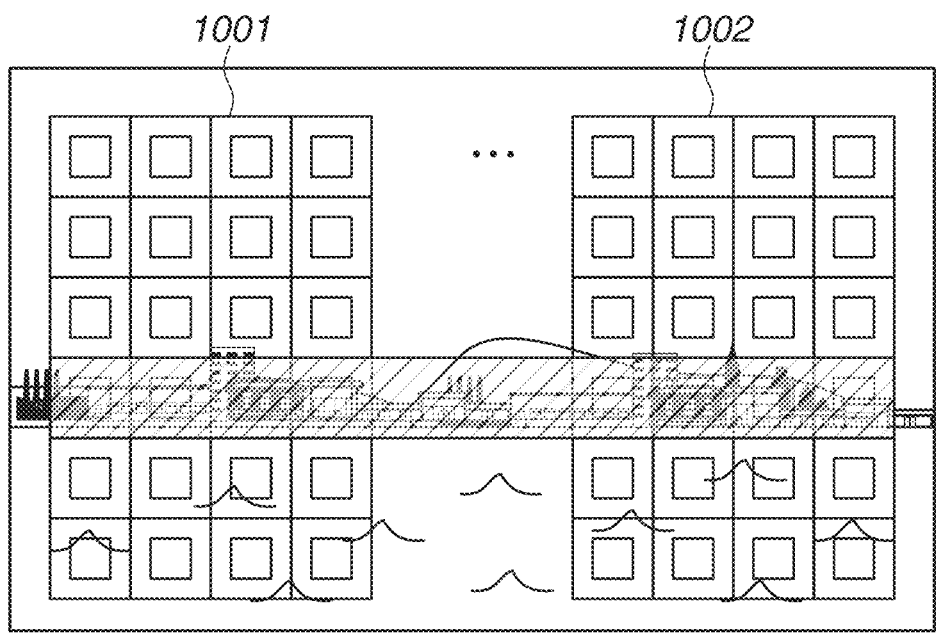

There are mainly three types of cases in which the areas in which the control unit 101 succeeded in detection of the motion vector are distributed only a part of the image along the moving direction. The first type is the case in which a pattern changes little with respect to the moving direction of the digital camera as described above in FIGS. 7A to 7E. The second type is the case in which a characteristic pattern is included in a part of the small areas distributed along the moving direction as illustrated in FIGS. 9A and 9B. FIG. 9A illustrates an image in which a bridge passes in front of a mountain, and FIG. 9B illustrates a situation in which the control unit 101 sets the detection areas. In the case where the control unit 101 sets a detection area 901, a pattern changes little in an area to be a template, and if the motion vector can be detected, the accuracy is low as with the case of FIGS. 7A to 7E. In this case, even if the control unit 101 resets the detection area, it is highly likely that the detected motion vector is determined as a different one in step S508. On the other hand, in the case that the control unit 101 sets a detection area 902, an area to be a template overlaps with a bridge pier as a characteristic pattern, and the accuracy of the detected motion vector is higher compared to the detection area 901. In this case, when the control unit 101 resets the detection area, it is highly likely that the detected motion vector is determined as the similar one in step S508. The third type is the case in which characteristic patterns are included in all of the small areas distributed along the moving direction as illustrated in FIGS. 10A and 10B. FIG. 10A illustrates an image in which buildings in different shapes stand on the coast, and FIG. 10B illustrates a situation in which the control unit 101 sets the detection areas. The control unit 101 can detect the highly accurate motion vectors in the small areas overlapping with a shaded portion if the control unit 101 sets either of detection areas 1001 and 1002 or sets the detection area on another place along the moving direction. In the image illustrates in FIG. 10A, wherever the control unit 101 sets the detection area, it is highly likely that the detected motion vector is determined as similar to the motion vector detected by resetting the detection area.

Next, the image composition in step S304 is described.

Figure 11:
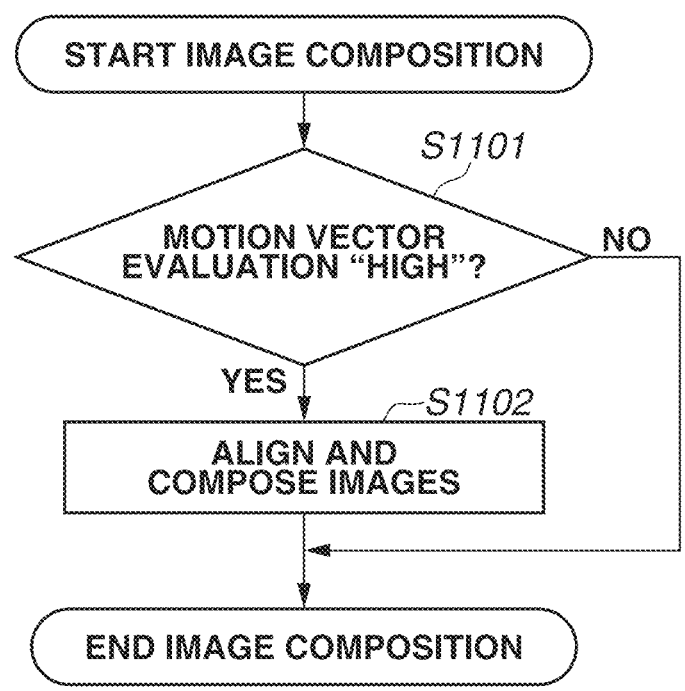
FIG. 11 is a flowchart illustrating image composition according to the first exemplary embodiment.

FIG. 11 is a flowchart illustrating the image composition according to the present exemplary embodiment. In step S1101, the control unit 101 determines whether the motion vector evaluation flag detected from the image captured in step S302 is "High". When the motion vector evaluation flag is "High" (YES in step S1101), the control unit 101 advances the processing to step S1102 and performs alignment and composition using the relevant images based on the detected motion vectors. As a method for alignment, simplified alignment may be performed which uses a known projective transformation, an affine transformation coefficient, and only vertical and horizontal shifts. On the other hand, when the motion vector evaluation flag is not "High" (NO in step S1101), the relevant image is not used in the composition. Thus, the image of which the motion vector evaluation flag is "Low" is excluded from the panoramic image composition, and a defect field angle is compensated using the image of which the motion vector evaluation flag is "High" instead.

According to the first exemplary embodiment, accuracy of a motion vector is determined, an image to be used in panoramic image composition of is selected, and thus alignment can be performed more highly accurately.

According to a second exemplary embodiment, unlike the first exemplary embodiment, an area clipped from a center of an image is used as much as possible for panoramic image composition in consideration of distortion of an image. According to the first exemplary embodiment, an image of which the motion vector evaluation flag is "Low" is excluded from the panoramic image composition. A field angle corresponding to the excluded image is compensated with another image. However, as described above, it is generally desirable that an area clipped from a center of an image is used for composition in consideration of distortion of an image. When an area clipped from another image is used as an alternative, only an area distant from the center can be used, and there is a possibility that a composite panoramic image causes a feeling of strangeness because of distortion of the image. In addition, when images of which the motion vector evaluation flag is "Low" are consecutively captured, there is a possibility that image areas which can be used for composition are interrupted in the middle, and a part of a field angle in the panoramic image may be lost. In order to solve the above-described issues, according to the present exemplary embodiment, the motion vector evaluation flag is classified into "High", "Middle", and "Low", and the detection areas of which the motion vector evaluation flag is "High" and a part of the detection areas of which the motion vector evaluation flag is "Middle" are used in composition. The present exemplary embodiment is described in detail below. Description of parts similar to that in the first exemplary embodiment are omitted.

The flowchart according to the present exemplary embodiment is similar to that in FIG. 3 according to the first exemplary embodiment, however, the motion vector evaluation in step S303 and the image composition in step S304 are different from that in the first exemplary embodiment.

Figure 12:
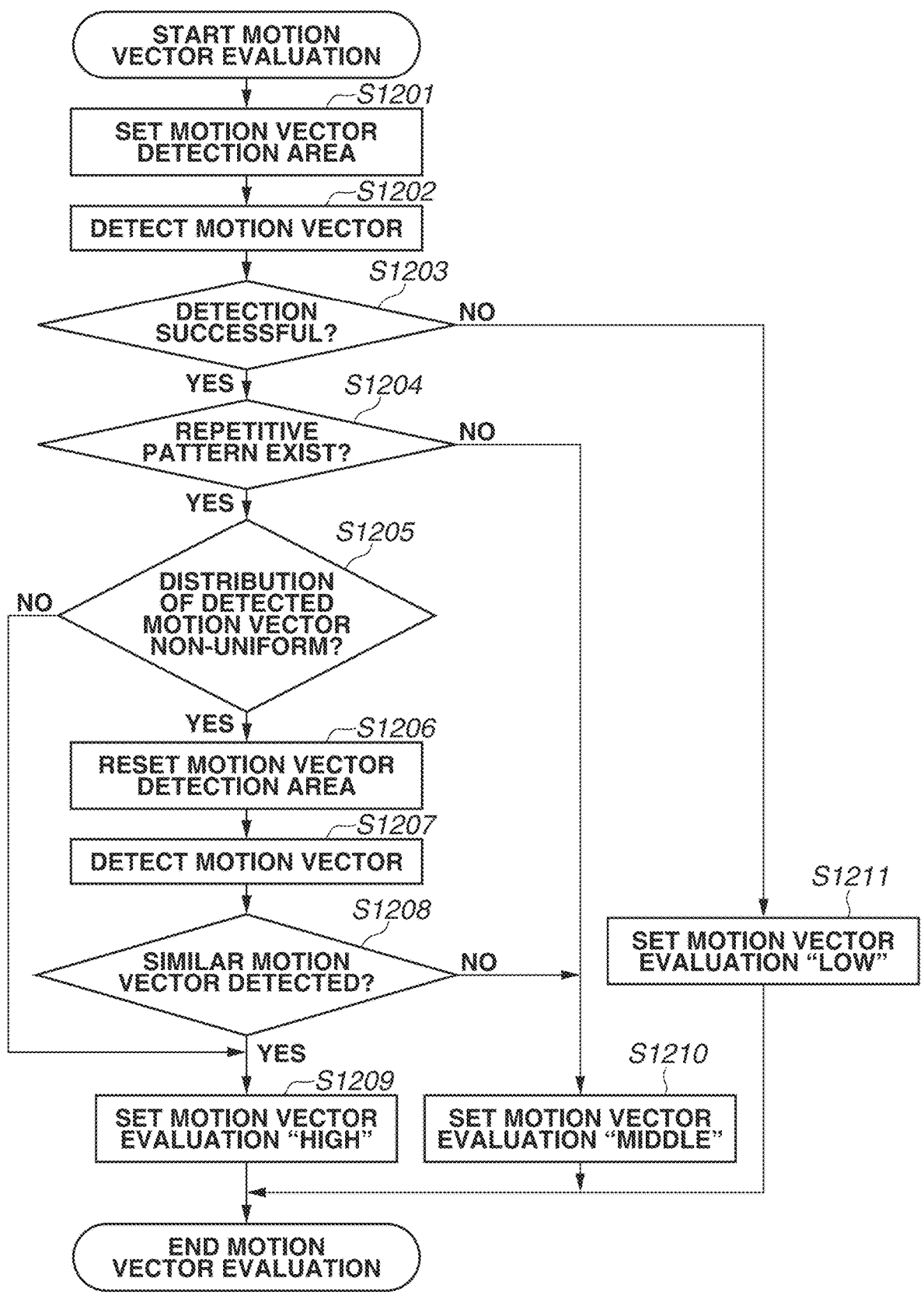
FIG. 12 is a flowchart illustrating motion vector evaluation according to a second exemplary embodiment.

FIG. 12 is a flowchart illustrating the motion vector evaluation according to the present exemplary embodiment. The flowchart illustrated in FIG. 12 is different in a following point from the flowchart illustrated in FIG. 5 according to the first exemplary embodiment. "Middle" is added to the type of the motion vector evaluation flag, and the control unit 101 sets the motion vector evaluation flag detected in step S1202 to "Middle" in step S1210 in a specific case. The specific case includes when the repetitive pattern does not exist in step S1204 (NO in step S1204), and when the motion vector detected in step S1208 is not similar (NO in step S1208).

Figure 13:
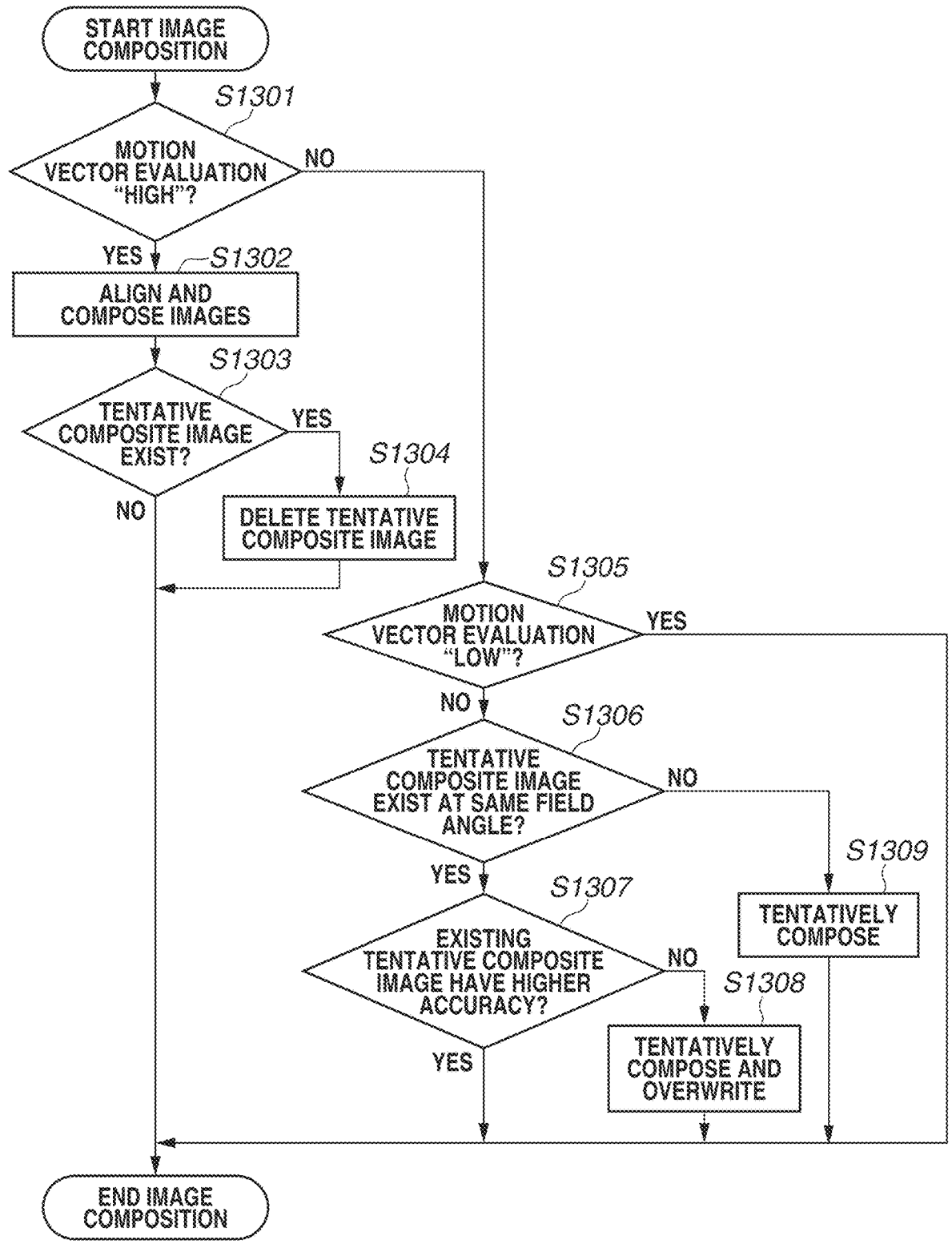
FIG. 13 is a flowchart illustrating image composition according to the second exemplary embodiment.

FIG. 13 is a flowchart illustrating the image composition according to the present exemplary embodiment. The flowchart illustrated in FIG. 13 is different in a point that tentative composition processing is included from the flowchart illustrated in FIG. 11 according to the first exemplary embodiment.

As described above, according to the first exemplary embodiment, there is a possibility that excluding all images of which the motion vector evaluation flag is "Low" from image composition gives a feeling of strangeness in a panoramic image. In order to solve the issue, according to the present exemplary embodiment, the motion vector evaluation flag of "Middle" is provided, and tentative composition is performed on an image of which the motion vector evaluation flag is "Middle". The control unit 101 generates a tentative composite image by tentative composition processing. The tentative composite image is used as a backup for composition of a final panoramic image and used in a field angle in which an image of which the motion vector evaluation flag is "High" does not exist.

In step S1301, the control unit 101 determines whether the motion vector evaluation flag detected in step S1202 is "High". When the motion vector evaluation flag is "High" (YES in step S1301), the control unit 101 advances the processing to step S1302, whereas when the motion vector evaluation flag is not "High" (NO in step S1301), the control unit 101 advances the processing to step S1305. In step S1305, the control unit 101 determines whether the detected motion vector evaluation flag is "Low". When the motion vector evaluation flag is "Low" (YES in step S1305), the control unit 101 terminates the flow of composition processing of the relevant image, whereas when the motion vector evaluation flag is not "Low" (NO in step S1305), the control unit 101 advances the processing to step S1306. In other words, according to the processing in steps S1301 and S1305, the control unit 101 terminates the flow when the motion vector evaluation flag is "Low" and advances the processing to step S1306 when the flag is "Middle" or to step S1302 when the flag is "High".

In step S1302, the control unit 101 performs alignment and composition of the images as with the case in step S1102 according to the first exemplary embodiment. Next, in step S1303, the control unit 101 determines whether a tentative composite image exists which has a field angle used for composition in step S1302. The tentative composite image mentioned here is the one generated by the control unit 101 in step S1308 or S1309 described below. According to the present exemplary embodiment, an area of which the motion vector evaluation flag is "High" is preferentially used for composition, so that the tentative composite image having the same field angle becomes unusable and is deleted by the control unit 101 in step S1304. On the other hand, when the relevant tentative composite image does not exist (NO in step S1303), the control unit 101 terminates the flow.

In step S1306, the control unit 101 determines whether a tentative composite image exists which has a field angle same as a field angle of the area determined that the motion vector evaluation flag is "Middle" in step S1305. When the relevant tentative composite image already exists (YES in step S1306), the control unit 101 advances the processing to step S1307 and compares accuracy of motion vectors between the existing tentative composite image and an image to be subjected to tentative composition. Details are described below. In step S1306, when it is determined that the tentative composite image does not exist (NO in step S1306), the control unit 101 advances the processing to step S1309 and performs tentative composition. It is not illustrated in FIG. 13, preprocessing such as alignment is required before the tentative composition as with composition in step S1302. When the accuracy of the existing tentative composite image is higher (YES in step S1307), the control unit 101 terminates the flow of composition of the relevant image, whereas when the accuracy of the existing tentative composite image is lower (NO in step S1307), the control unit 101 advances the processing to step S1308 and generates a new tentative composite image.

Next, comparison of accuracy in step S1307 is described. The control unit 101 compares the motion vector detected in the detection area and the motion vector detected by resetting the detection area with respect to each of the existing tentative composite image and the image to be subjected to tentative composition. It is regarded that the accuracy is higher as the number of the motion vectors having the same magnitude and the same direction is larger in the two groups of the motion vectors. The method for resetting the detection area may be the same as that in step S1206, and the detection area is reset by narrowing down the previously set detection area.

According to the second exemplary embodiment, tentative composition is performed, and higher accurate one in the tentative composite images is used for composition, so that distortion of a composite image and a defect in a field angle can be avoided.

Other Embodiments

The exemplary embodiments are described above based a personal digital camera, however, can be applied to a mobile device, a smartphone, or a network camera connected to a server as long as the device has a panoramic image capturing function and a composition function.

Embodiments of the present invention can also be realized by executing the following processing. More specifically, a program for realizing one or more functions of the above-described exemplary embodiments is supplied to a system or an apparatus via a network or a storage medium, and one or more processors in a computer of the system or the apparatus reads and executes the program. Further, embodiments of the present invention can also be realized by a circuit (e.g., an application specific integrated circuit (ASIC)) for realizing one or more functions of the above-described exemplary embodiments.

According to embodiments of the present invention, a panoramic image can be generated which has high alignment accuracy among a plurality of images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-160568, filed Aug. 23, 2017, which is hereby incorporated by reference herein in its entirety.

What is claimed is:

1. An image processing apparatus, comprising:
at least one memory storing instructions; and
at least one processor connected to the at least one memory and configured to execute the instructions which, when executed by the at least one processor, cause the image processing apparatus to:
  detect a motion vector from a first area of a first image;
  detect a motion vector from a second area of the first image, the second area of the first image smaller than the first area of the first image;
  determine that a difference between the motion vector detected from the first area of the first image and the motion vector detected from the second area of the first image is not within a predetermined range;
  detect a motion vector from a first area of a second image;
  detect a motion vector from a second area of the second image, the second area of the second image smaller than the first area of the second image;
  determine that a difference between the motion vector detected from the first area of the second image and the motion vector detected from the second area of the second image is within the predetermined range; and
  perform a combination using at least a part of the first image and at least a part of the second image to generate a panoramic image, wherein the first image is used in the combination in a field angle in which the first image does not overlap with the second image.

2. The image processing apparatus according to claim 1, wherein the instructions, when executed by the at least one processor, further cause the image processing apparatus to:
detect a motion vector from a first area of a third image;
detect a motion vector from a second area of the third image, the second area of the third image smaller than the first area of the third image;
determine that a difference between the motion vector detected from the first area of the third image and the motion vector detected from the second area of the third image is not within the predetermined range;
determine that the third image has a field angle which overlaps with the second image; and
not use the third image in the combination.

3. The image processing apparatus according to claim 1, wherein the instructions, when executed by the at least one processor, further cause the image processing apparatus to:
detect a motion vector from a first area of a third image;
detect a motion vector from a second area of the third image, the second area of the third image smaller than the first area of the third image;
determine that a difference between the motion vector detected from the first area of the third image and the motion vector detected from the second area of the third image is not within the predetermined range;

determine that the third image exists in the field angle of the first image which does not overlap with the second image;

perform a comparison of accuracy of motion vectors between the first image and the third image, the comparison of accuracy comprising:
  determining accuracy with respect to the first image based at least in part on comparing the motion vector detected from the first area of the first image with the motion vector detected from the second area of the first image;
  determining accuracy with respect to the third image based at least in part on comparing the motion vector detected from the first area of the third image with the motion vector detected from the second area of the third image; and
  comparing the accuracy of the first image with the accuracy of the third image; and determine that the accuracy of the first image is higher than the accuracy of the third image based on the comparison of accuracy, wherein the first image is used in the combination based on the determination that the accuracy of the first image is higher than the accuracy of the third image.

4. The image processing apparatus according to claim 3, wherein the motion vector detected from the first area of the first image is one of a plurality of motion vectors detected from the first area of the first image, and the motion vector detected from the second area of the first image is one of a plurality of motion vectors detected from the second area of the first image,
  wherein the determining the accuracy with respect to the first image comprises:
    comparing respective magnitudes and directions of the plurality of motion vectors detected from the first area of the first image with respective magnitudes and directions of the plurality of motion vectors detected from the second area of the first image; and
    determining a first number of motion vectors for which it is determined that a magnitude and a direction are same between the motion vector detected from the first area of the first image and the motion vector detected from the second area of the first image;
  wherein the motion vector detected from the first area of the third image is one of a plurality of motion vectors detected from the first area of the third image, and the motion vector detected from the second area of the third image is one of a plurality of motion vectors detected from the second area of the third image,
  wherein the determining the accuracy with respect to the third image comprises:
    comparing respective magnitudes and directions of the plurality of motion vectors detected from the first area of the third image with respective magnitudes and directions of the plurality of motion vectors detected from the second area of the third image; and
    determining a second number of motion vectors for which it is determined that a magnitude and a direction are same between the motion vector detected from the first area of the third image and the motion vector detected from the second area of the third image;
  wherein comparing the accuracy of the first image with the accuracy of the third image comprises comparing the first number with the second number, and
  wherein the determination that the accuracy of the first image is higher than that of the third image is based on the first number being higher than the second number.

5. The image processing apparatus according to claim 1, wherein the instructions, when executed by the at least one processor, further cause the image processing apparatus to:
  after detection of the motion vector from the first area of the first image, determine whether a repetitive pattern exists in the first area of the first image;
  determine that a repetitive pattern does not exist in the first area of the first image; and
  detect the motion vector from the second area of the first image based on the determination that a repetitive pattern does not exist in the first area of the first image.

6. The image processing apparatus according to claim 1, wherein the instructions, when executed by the at least one processor, further cause the image processing apparatus to:
  determine that a predetermined condition is satisfied based on positions of detection of motion vectors from a detection area of a third image; and
  use the third image in the combination to generate the panoramic image.

7. The image processing apparatus according to claim 6, wherein the predetermined condition is that a distribution of the motion vectors detected from the detection area of the third image is uniform.

8. The image processing apparatus according to claim 1, wherein the instructions, when executed by the at least one processor, further cause the image processing apparatus not to use a third image in the combination in a case where a number of motion vectors determined as successfully detected from a first area of the third image is less than a predetermined number.

9. An image pickup apparatus, comprising:
  an image sensor configured to capture a plurality of images;
  at least one memory storing instructions; and
  at least one processor connected to the at least one memory and configured to execute the instructions, which when executed by the at least one processor, cause the image pickup apparatus to:
    detect a motion vector from a first area of a first image of the plurality of images;
    detect a motion vector from a second area of the first image, the second area of the first image smaller than the first area of the first image;
    determine that a difference between the motion vector detected from the first area of the first image and the motion vector detected from the second area of the first image is not within a predetermined range;
    detect a motion vector from a first area of a second image of the plurality of images;
    detect a motion vector from a second area of the second image, the second area of the second image smaller than the first area of the second image;
    determine that a difference between the motion vector detected from the first area of the second image and the motion vector detected from the second area of the second image is within the predetermined range; and
    perform a combination using at least a part of the first image and at least a part of the second image to generate a panoramic image, wherein the first image is used in the combination in a field angle in which the first image does not overlap with the second image.

10. A method for controlling an image processing apparatus, the method comprising:
   detecting a motion vector from a first area of a first image;
   detecting a motion vector from a second area of the first image, the second area of the first image smaller than the first area of the first image;
   determining that a difference between the motion vector detected from the first area of the first image and the motion vector detected from the second area of the first image is not within a predetermined range;
   detecting a motion vector from a first area of a second image;
   detecting a motion vector from a second area of the second image, the second area of the second image smaller than the first area of the second image;
   determining that a difference between the motion vector detected from the first area of the second image and the motion vector detected from the second area of the second image is within the predetermined range; and
   performing a combination using at least a part of the first image and at least a part of the second image to generate a panoramic image, wherein the first image is used in the combination in a field angle in which the first image does not overlap with the second image.

11. A non-transitory computer readable storage medium storing instructions which, when executed by at least one processor, cause the at least one processor to:
   detect a motion vector from a first area of a first image;
   detect a motion vector from a second area of the first image, the second area of the first image smaller than the first area of the first image;
   determine that a difference between the motion vector detected from the first area of the first image and the motion vector detected from the second area of the first image is not within a predetermined range;
   detect a motion vector from a first area of a second image;
   detect a motion vector from a second area of the second image, the second area of the second image smaller than the first area of the second image;
   determine that a difference between the motion vector detected from the first area of the second image and the motion vector detected from the second area of the second image is within the predetermined range; and
   perform a combination using at least a part of the first image and at least a part of the second image to generate a panoramic image, wherein the first image is used in the combination in a field angle in which the first image does not overlap with the second image.

* * * * *